United States Patent [19]

Stella et al.

[11] 4,027,956
[45] June 7, 1977

[54] APPARATUS FOR FACILITATING ENGAGEMENT BETWEEN FILM AND FILM ACTUATED PULL-STRIP

[75] Inventors: Joseph A. Stella, Peabody; Paul B. Mason, Magnolia, both of Mass.

[73] Assignee: Polaroid Corporation, Cambridge, Mass.

[22] Filed: Aug. 12, 1976

[21] Appl. No.: 713,693

[52] U.S. Cl. .............................. 352/130; 352/72; 352/78 R
[51] Int. Cl.² ...................................... G03C 11/00
[58] Field of Search ................... 352/72, 130, 78 R

[56] References Cited

UNITED STATES PATENTS

| | | | |
|---|---|---|---|
| 3,895,862 | 7/1975 | Stella | 352/130 |
| 3,923,520 | 12/1975 | Burke | 352/130 |
| 3,951,530 | 4/1976 | Czumak | 352/130 |

*Primary Examiner*—Monroe H. Hayes
*Attorney, Agent, or Firm*—Frederick A. Goettel, Jr.

[57] ABSTRACT

Apparatus for facilitating the achievement of locking engagement between the film strip contained in a film cassette of the type in which the film may be exposed, processed and projected without removal from the cassette, and a pull-strip for removing a tear-tab closure initially sealing a supply of processing fluid within the cassette. The supply end of the film strip contains a bottle-shaped aperture through which a tapered latching tongue provided at the free end of the pull-strip passes upon initiation of rewind after exposure. The supply reel hub is provided with a latching tongue receiving surface lying below the film receiving surface of the hub which, upon continued advancement of the film strip, receives and supports the latching tongue to fold it back upon itself.

The bottle-shaped aperture in the film strip includes a first section through which the tapered latching tongue initially passes and a locking section communicating with the first section by a narrow passageway defined by a pair of inwardly extending tabs. The passageway defined by the inwardly extending tabs is narrower than the tapered latching tongue and the tabs are caused to deflect downwardly into the region below the hub surface and above the latching tongue receiving surface to further facilitate passage of the latching tongue into locking engagement with the film strip aperture responsive to the resisting force of the initial removal of the tear-tab closure.

12 Claims, 7 Drawing Figures

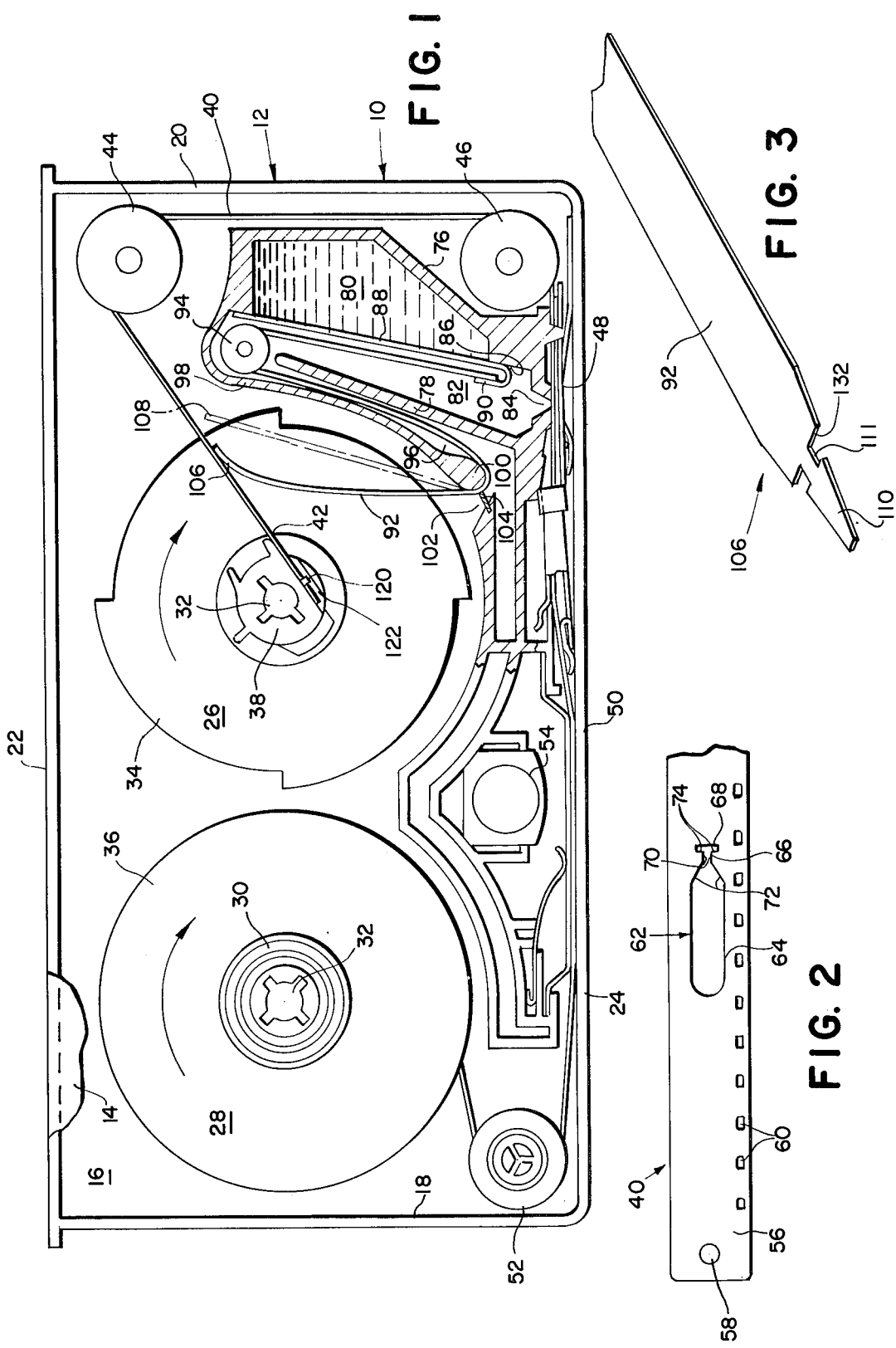

APPARATUS FOR FACILITATING ENGAGEMENT BETWEEN FILM AND FILM ACTUATED PULL-STRIP

BACKGROUND OF THE INVENTION

This invention relates to multi-purpose, photographic film cassettes and more particularly, it concerns an improved apparatus for facilitating positive engagement between an advancing film strip and a film actuated pull-strip for releasing processing fluid from an initially sealed reservoir forming part of a film processing organization of such a cassette.

Multi-purpose, photographic film cassettes have been developed for use in motion picture photographic systems illustrated and described, for example, in U.S. Pat. No. 3,615,127 issued to Edwin H. Land on Oct. 26, 1971; U.S. Pat. No. 3,623,417 issued to Vito K. Eloranta on Nov. 30, 1971; and in U.S. Pat. No. 3,785,725 issued to J. F. Batter et al on Jan. 15, 1974, all of which are owned by the assignee of the present invention. In such systems, a strip of photographic film contained in a cassette can be exposed in a camara adapted to receive the cassette and then processed to provide viewable images by placing the cassette in a viewing apparatus equipped to activate a cassette contained processor upon rewinding the exposed film strip. After processing in this manner, the viewing apparatus is operated as a projector to advance the film incrementally frame by frame past the light source so that the scene to which the film was exposed is reproduced in a manner well known in the motion picture art.

In motion picture systems of the type described above, the processing operation after film exposure and before viewing entails the deposition of a uniform coating of processing fluid along the length of the film strip to effect a diffusion transfer of a negative image in a light-sensitive emulsion layer on the film strip to a positive image-receiving layer or interface. The processing fluid supply is contained in an initially closed reservoir or pod housed within the film cassette, the reservoir having a removable tear-tab closure capable of being opened upon activation of the film processor by the viewing apparatus to allow the fluid to escape from the pod and pass through a nozzle-like opening against the exposed emulsion layer of the film strip. Although the processor is operated only once in any single cassette, which following processing provides a permanent housing for the processed film strip therein, its operation to achieve a uniform and complete layer of processing fluid over the exposed emulsion layer on the film strip is vital to satisfactory operation of the overall system.

To insure retention of the processing fluid in the cassette contained reservoir or pod up to the time it is needed for the processing operation, and also in some measure to insure complete availability of the processing fluid upon initial activation of the processor, the processing fluid reservoir in such systems is provided with a relatively large opening covered initially by a releasably bonded tear-tab closure capable of being completely peeled from the opening to release the processing fluid for distribution against the emulsion layer of the exposed film strip. In more advanced systems similar to the type mentioned above, the release of processing fluid from the reservoir is brought about by a pull-strip extension connected at one end to a folded back portion of the reservoir sealing tear-tab and having at its free end, a configuration adapted to engage an aperture formed in the leader end of the film strip attached to the supply spool during initial rewind rotation of the supply spool. The pull-strip, which may be mylar or other similar material is initially supported and constrained to an essentially Z-shaped path in which the intermediate leg is established by a channel formed by internal cassette walls. At its exit from the channel, the extension is bent back on itself without exceeding the elastic limits of the material from which it is made so that the projecting free end lies yieldably against the outer convolutions of the film strip on the supply spool. As the film strip pays out from the supply spool during exposure, the free end of the pull-strip will move inwardly due to the diminishing diameter of film strip convolutions on the supply spool until the film strip is completely exposed. At this time, an aperture in the supply spool connected leader end of the film strip will have passed the free end of the pull-strip extension so that upon rewinding of the film strip back onto the supply spool the free end of the pull-strip will engage the film strip aperture and become entrained between successive convolutions of the film strip supply spool leader. Continued rewind rotation of the supply spool effects a pulling action on the pull-strip and correspondingly, a peeling of the tear-tab closure from the processing fluid reservoir to release the processing fluid for application thereof to the exposed film strip.

Such an arrangement for release of processing fluid from the reservoir is shown and described in U.S. Pat. No. 3,895,862 issued to Joseph A. Stella et al. on July 22, 1975. As described in detail in this patent, the pull-strip is provided with a tapered necked down latching tongue configured to engage a bottle-shaped aperture in the film strip defined by an elongated engaging section and a locking section communicating with the engaging section through a necked down passageway. Following complete payout of the film strip from the supply reel and upon initial rewind movement of the film strip back onto the supply reel, the latching tongue engages the elongated section of the bottle-shaped aperture and upon further rewinding of the film strip the latching tongue engages the film reel hub and as the film strip continues to be rewound upon the reel, the pull-strip is placed in tension as the resisting force of the tear-tab is encountered by the advancing film strip/pull-strip combination. The necked down portion of the latching tongue is intended to pass through the necked down portion of the bottle-shaped aperture in the film strip and into positive engagement with the locking portion of the aperture in response to this resisting force. Such a locking engagement between the tear-tab actuating pull-strip and the film strip is extremely important as it is desirable for the pull-strip to remain positively attached to the film strip during subsequent projecting of the processed film strip in order to preclude problems which would be encountered were the pull-strip to separate from the film strip and possibly interfere with operation of the cassette. In some applications the frictional forces between the bent over latching tongue and the hub-surface and the interleaved film strip and pull-strip have been in excess of the force required to remove the tear-strip from the processing fluid reservoir and accordingly sufficient force has not always been available at the interface of the necked down portion of the latching tongue and the necked down portion of the film strip aperture to pull the latching tongue into locking engagement with the locking portion of the aperture.

SUMMARY OF THE INVENTION

In accordance with the present invention, an improved multi-purpose film cassette is provided for use in motion picture photographic systems of the type described above which require no external means for effecting release of processing fluid from an initially sealed storage reservoir to initiate a processing cycle automatically upon rewinding the film strip after exposure in the cassette. As further described above, the release of processing fluid from the reservoir is brought about by a pull-strip connected at one end to a reservoir sealing tear-tab and having at its free end a latching tongue configuration adapted to engage in an aperture formed in the leader end of the film strip attached to the supply spool, during initial rewind rotation of the supply spool. A recess is provided in the annular surface of the supply spool hub for receiving and supporting the latching tongue section of the pull-strip upon advancement of the film strip. The recess provides a tongue engaging surface at a depth below the annular hub surface sufficient to bend the latching tongue into a position substantially parallel to the film strip surface while at the same time precluding binding engagement of the tongue between the supply reel hub and the film strip thereby permitting relative motion therebetween and facilitating achievement of locking engagement between the latching tongue and the film, in response to the resisting force during removal of the tear-tab closure.

In a preferred embodiment the film strip contains a necked down aperture comprising a latching tongue receiving portion nearest the supply spool end of the film strip & a locking portion spaced from the tongue receiving portion by a necked down portion which is defined by a pair of opposing inwardly extending tabs. The passageway defined by these tabs is narrower than a portion of the latching tongue which must pass through this passageway in order to achieve the desired engagement with the locking portion of the aperture. The recess is configured so that the passageway defining tabs directly overlie at least a part of the recess when the pull-strip is placed in tension in response to the resisting force of the tear-tab. At this time the latching tongue forceably engages the inwardly extending tabs and causes them to deflect downwardly into the recess thereby increasing the width of the passageway between the latching tongue receiving section and the locking portion and facilitating passage of the latching tongue into positive engagement with the locking portion of the aperture.

BRIEF DESCRIPTION OF THE DRAWINGS

FIG. 1 is a diagrammatic side elevational view of a film cassette according to the present invention with the front wall thereof cut away and other portions thereof in partial section to illustrate the internal working components;

FIG. 2 is a plan view of a supply leader end of a film strip utilized in the cassette shown in FIG. 1;

FIG. 3 is a perspective view illustrating a free end of a pull-strip employed in FIG. 1;

DETAILED DESCRIPTION OF THE PREFERRED EMBODIMENT

Figure 4:
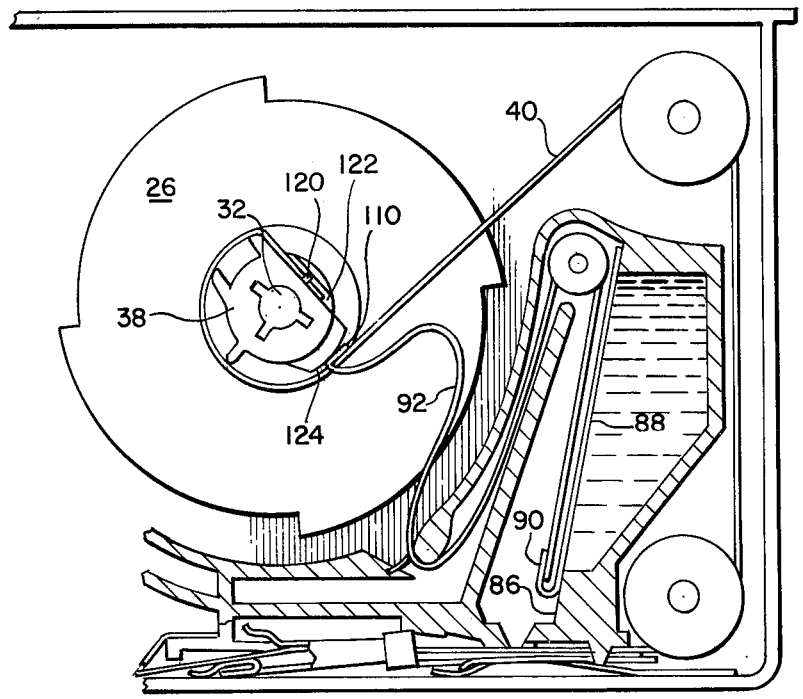
FIGS. 4 and 5 are cut away fragmentary side elevations illustrating a cassette supply spool and tear-tab closure pull-strip of the cassette of FIG. 1 in different phases of the engagement between the pull-strip and the film strip.

In the drawings, the improved multipurpose cassette of the present invention is generally designated by the reference numeral 10 as shown in FIG. 1, the cassette includes a generally parallel-piped casing or housing 12 defined by planar faces or side walls 14 and 16, end walls 18 and 20, and elongated top and bottom edge walls 22 and 24. A pair of reels respectively designated hereinafter as supply reel 26 and takeup reel 28 are supported for rotation in the housing by annular barings 30 on the reels are engaged by complementing ring-like embossments (not shown) on the interior of the side walls 14 and 16. Each reel is also provided with a drive socket 32 adapted for engagement by appropriate drive shafts in either the camera (not shown) or the viewing apparatus (not shown) with which the cassette is used in accordance with the overall system described in the prior references cited above. Each of the reels 26 and 28 is provided further with a pair of opposed flanges 34 and 36 fixed to opposite ends of central hubs 38 and 39, respectively, to which opposite ends of a film strip 40 are permanently connected. In FIG. 1 the film strip is shown in the position it would be in immediately following complete exposure or projection of the film strip, that is, with most of the film strip wound onto the takeup reel 28. Still referring to FIG. 1, it will be noted that the path of the film strip 40 in the housing 12 extends from its point of connection 42 at the hub 38 of the supply reel 26 about guide rollers 44 and 46, across a normally inoperative film processing station 48, and opening 50 in the bottom edge wall 24, about a further guide roll 52 and to the takeup reel 28. The opening 50 functions at different times to facilitate both exposure and projection of the film strip 40, a prism 54 being located behind the film strip at the opening 50 to facilitate the latter operation.

FIG. 2 in the drawings illustrates the end 56 of the film strip 40 which is attached to the supply reel 26. This end of the film strip is commonly referred to as the supply leader and is provided with an aperture 58 for permanent connection to the hub 38 of the supply reel 26. The major central portion of the film upon which projectable images may be formed (not shown) includes a carrier base of any suitably strong transparent material carrying an emulsion or photosensitive coating of any conventional variety; for example, an emulsion developed by a monobath processing composition to form a positive transparency suitable for projection. A series of uniformally spaced sprocket holes 60 are provided along the length of the film as is conventional to facilitate incremental film advance during exposure and projection.

Referring still to FIG. 2, the supply leader 56 is provided with a discontinuity, preferably an aperture 62, of bottle-shaped configuration to provide an elongated major aperture portion 64 extending in the direction of the end of the supply leader 56, a necked down portion 66, and an undercut or transverse slot-like portion 68 hereinafter referred to as the locking portion of the aperture. The necked down portion, or passageway 66 is defined by a pair of opposed inwardly extending tabs 70 each of which is provided with an inclined ramp-like edge 72 on the side communicating with the major aperture portion 64 and an abrupt edge portion 74 extending substantially perpendicular to the longitudinal dimension of the film strip, facing the locking portion 68. The aperture 62 is disposed a predetermined distance from the end of the supply leader which is less than the circumference of the supply reel hub 38. The function, operation and significance of the location of the aperture 62 will be described in more detail below.

With reference again to FIG. 1 of the drawings, it will be noted that the processing station 48 is formed in part by internal cassette transverse wall formations 76 and 78 defining in part a pair of chambers 80 and 82, the latter of which opens at its bottom to a processing fluid applicator nozzle 84 positioned to overlie the emulsion carrying surface of the film strip 40 as it passes between the cassette exposure-projection opening 50 and the guide roller 46. The chamber 80 constitutes an initially sealed reservoir for processing fluid and opens along one upright side to the chamber 82 at a peripherally extending planar face 86 to which a releasable tear-tab closure 88 is initially affixed by bonding, fusion or the like.

Figure 5:
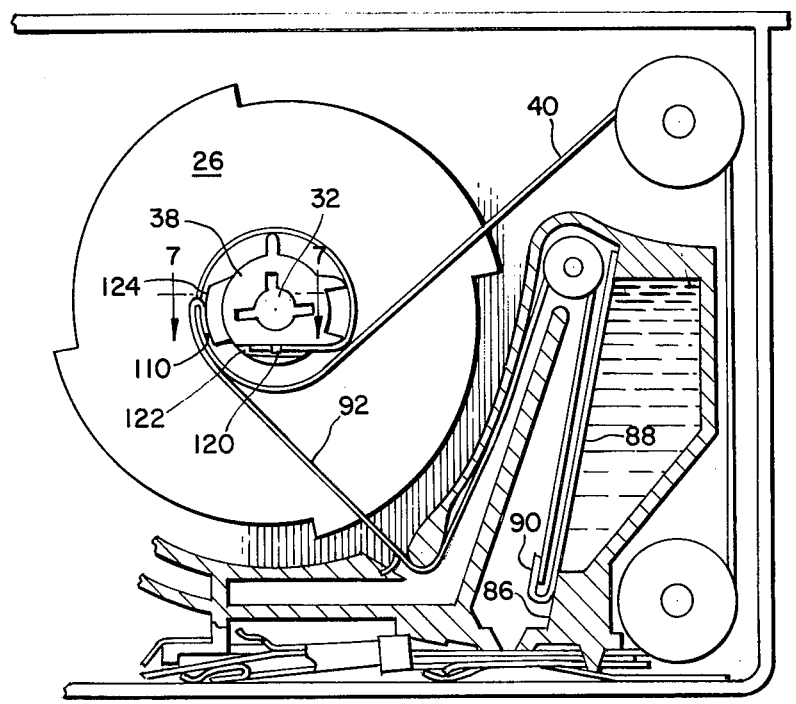

The tear-tab closure 88, as shown in FIGS. 1, 4 and 5 of the drawings, extends from the top of the chamber 80 downwardly over the planar face 86 to the bottom of the chamber near the nozzle 84 and is then folded or bent in a reverse direction at its lower end to establish an upwardly directed leading end portion 90 secured by bonding, fusion or other suitable means to one end of a pull-strip extension 92. The attachment of the tear-tab to the pull-strip extension is in an overlapping joint fashion so that the pull-strip 92 initially lies within the reverse bend of the tear-tab. Such an arrangement facilitates separation of the pull-strip from the tear-tab closure after these components have served their processing function as will be described herein below.

The pull-strip 92 extends upwardly from the lap joint with the tear-tab closure portion 90, about a guide roller 94 and thence downwardly through a channel 96 defined in part by the wall formation 78 and in part by another transverse wall formation 98. The wall formation 98 terminates at its lower end in an enlarged radius defining section 100 which establishes one side of an exit opening 102 from the channel 96 and through which the pull-strip 92 passes after a second reverse bend thereby to establish an initially essentially Z-shaped configuration in the pull-strip. A sealing member 104 of flexible material may be provided across the exit opening to seal the latter following processing. The pull-strip 92 is formed from any suitable resilient material such as mylar or other material and is initially supported in passing about the roller 94 and the radius 100 so as to stress the pull-strip within its elastic limit resulting in an inherent bias tending to restore the pull-strip to its initially straight condition. Accordingly, referring to FIG. 1, the free end portion 106 of the pull-strip 92 which projects from the exit 102 is urged yieldably against the outermost convolution of film strip wound on the supply spool 26. The pull-strip 92 is of sufficient length so that the free end of the pull-strip 106 will remain in contact with the outermost convolution of the film strip and will be directed in the direction of film strip travel during exposure of the film following complete payout of all of the film initially contained upon the supply reel 26. FIG. 1 shows the supply reel 26 film strip 40, and pull-strip 92 in their relative positions immediately following complete exposure of the film. The position that the free end 106 of the pull-strip would occupy approximately midway through the exposure cycle is depicted by phantom lines in FIG. 1 at reference numeral 108.

As shown in FIG. 3 of the drawings, the free end portion 106 of the pull-strip 92 includes a tapered latching tongue portion 110 which is connected to the pull strip 92 by a necked down portion 111. The width of the necked down portion 111 is greater than the width of the necked down passageway 66 in the film strip defined by the tabs 70. The size and shape of the latching tongue 110 and the necked down portion 111 are such that they will engage the bottle-shaped aperture 62 in the film strip 40 upon initial movement of the film strip 40 back onto the supply spool 26. Accordingly, it should be noted that the position of the bottle-shaped opening 62 on the film strip leader is such that it will be at or past the free end of the pull-strip 106 when the film strip has traveled fully from the supply spool 26 to the takeup spool 28 after exposure, as illustrated in FIG. 1.

Figure 7:
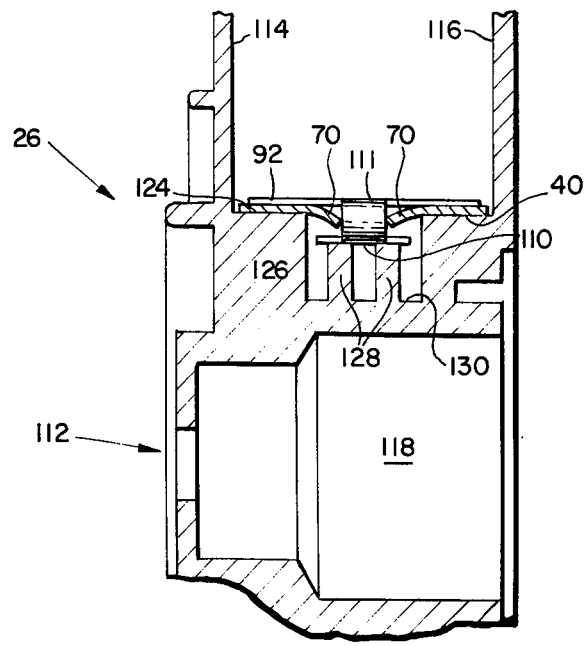
FIG. 7 is a sectional view of the supply reel hub taken substantially along the line 7—7 of FIG. 5.
Figure 6:
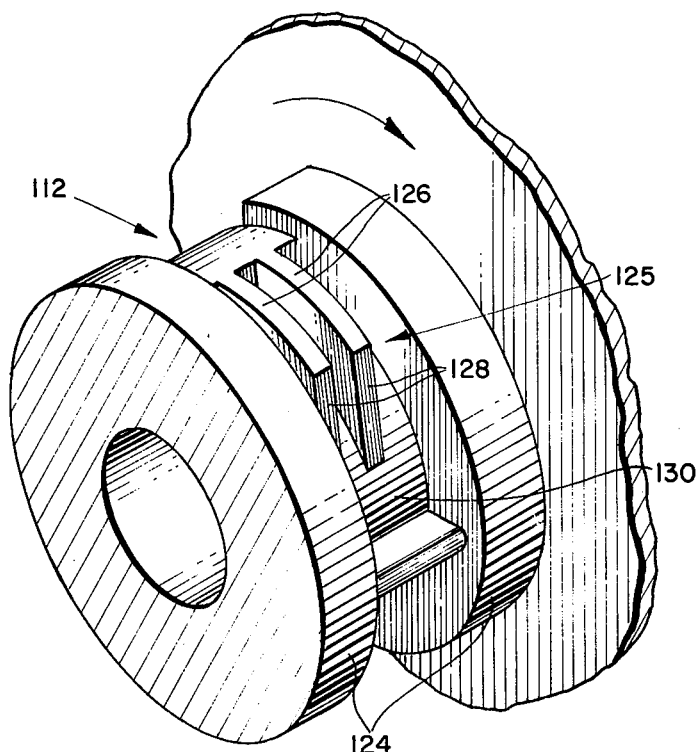
FIG. 6 is an enlarged partially cut away view in perspective of the supply reel illustrating the details of a recess employed in the cassette of FIG. 1.

The details of the hub configuration of the supply reel are illustrated in FIGS. 6 and 7. As is conventional, the supply reel is formed having a hub portion 112 and two flanges 114 and 116 located at either end of the hub 112. The hub portion of the reel 112 is formed having a central hollow opening 118 which is adapted to be engaged by a drive spindle or the like for driving rotation during normal operation. Means are also provided in the hub 112 to secure the end of the film strip supply leader 56. Referring to FIG. 1, in the illustrated embodiment, this connection is made by the engagement of aperture 58 in the end of the supply leader 56 with a suitable connecting pin 120 provided in a chordal slot 122 in the hub portion. Referring back to FIGS. 6 and 7, the supply reel hub 112 includes an outer annular film strip receiving surface 124 upon which the film strip is coiled responsive to rotation of the reel.

In accordance with the present invention, the reel hub is provided with a recess 125 which includes a latching tongue receiving surface 126 at a depth below the film strip receiving surface and which is positioned in the hub 112 such that when the supply reel 26 is rotated to rewind the film strip thereupon, the aperture 62, and more specifically, the region of the necked down portion 66 and the locking portion 68 will be in overlying relationship therewith. Referring still to FIGS. 6 and 7, it will be seen that the latching tongue receiving surface 126 is defined by the upper end of a pair of upstanding wall-like sections 128 extending upwardly to the desired level from a lower surface 130 even further below the surface of the hub upon which the film strip is received.

While the latching tongue receiving surface 126 shown and described in connection with the preferred embodiment is defined by the pair of upstanding wall sections 128, this surface could as well be defined by a single wide wall section, or, by a simple recessed section below the film receiving surface 124 of the hub. The use of the two upstanding walls 128 to define the surface 126 is a manufacturing technique for minimizing the mass of material in this region, necessitated by the fact that the reels are fabricated from a plastic material by an injection molding process. This configuration results in a substantially uniform thickness of material throughout the reel and accordingly a uniform rate of cooling, minimizing the possibility of distortion in the reel during cooling. Other materials or methods of manufacture could of course be used to made a reel with a hub having a latching tongue receiving surface of a different configuration as described above.

Operation of the improved cassette of the present invention to effect exposure of the film strip 40 in a suitable camera is essentially the same as that disclosed in the aforementioned U.S. Pat. No. 3,785,725. Following exposure in the camera, the cassette 10 is placed in a projecting apparatus so as to be vertically oriented in the position illustrated in FIG. 1 of the drawings. At this time the orientation of the film strip and the pull-strip 92 are also substantially as shown in FIG. 1 of the drawings.

Referring now to FIGS. 1, 4, 5 and 7 of the drawings, upon initiation of rewind of the film strip 40, the latching tongue 110 and the necked down portion 111 will pass into the major aperture portion 64 of the film strip aperture 62 and upon continued advancement of the film strip, the straight edge 132 defining the transition between the necked down section 111 and the pull strip 92 will ride upon the edges of the film strip adjacent the major aperture portion 64 until the necked down portion 111 comes into engagement with the inclined edge 72 defined by the inwardly extending tabs 70. As indicated above, the width of the necked down portion 111 of the latching tongue 110 is greater than the narrow passageway 66 defined by the tabs 70 and accordingly, since the pull-strip 92 is at this time not in tension and exerting no force upon the tab 88, locking engagement between the pull-strip and the film strip is not achieved at this time.

Referring to FIG. 4, it is seen that upon the continued advancement of the film strip 40 the latching tongue 110 comes into contact with the latching tongue receiving surface 124 and is thereby caused to be folded substantially parallel to and in a direction counter to the direction of travel of the film strip upon engaging the surface. Following such engagement of the latching tongue with the film strip and the surface 124, the pull strip continues to be carried with the film strip in the unlocked position described above until all of the slack has been taken out of the pull-strip 92 as is illustrated in FIG. 5. In FIG. 5 the pull-strip 92 is illustrated in a taut position just prior to experiencing the resisting force imparted by the initial separation of the tear-tab closure 88 from the planar face 86 to which it is attached. It is at this time that the resisting force of the tear-tab closure 88 is at its maximum and accordingly at this time, if it is to occur, that the tapered down neck section 111 of the latching tongue 110 will be caused to pass through the necked down portion 66 defined by the opposing tabs 70 and into locking engagement with the locking portion 68 of the aperture 62.

In prior arrangements of this type, for example, as shown in the prior referenced U.S. Pat. No. 3,895,862 the bent-over latching tongue 110 was at this time firmly held in substantially binding engagement between the uniform depth hub surface and the film strip, thereby occasionally prohibiting relative motion between the bent-over latching tongue and the hub surface, and, accordingly relative motion therebetween, and passage of the narrowed down section through the necked down aperture was resisted. Furthermore, as is evident from FIG. 5, the outer film strip surface and the inner surface of the pull-strip 92 are in intimate contact with one another at the point at which the pull-strip slack is taken up, thereby resulting in an additional resisting force to relative motion of the pull-strip and the film strip. The combination of these resisting forces, taken with the force necessary to pull the latching tongue through the necked down portion of the aperture was at times sufficient to overcome the resisting force of the tear-tab closure, resulting in release and removal of the tear-tab closure without achievement of the desired locking engagement between the pull-strip latching tongue and the film strip aperture.

Referring now first to FIGS. 4 and 5, it is seen that according to the present invention the latching tongue 110 upon its initial engagement with the hub is caused to be bent into the desired parallel relationship with the film strip 40 by engagement with the latching tongue receiving surface 126 which is at an elevation below the annular film receiving surface 124 of the hub. The latching tongue receiving surface 126 is at a depth sufficiently near the film receiving surface 124 to insure bending of the latching tongue 110 to the desired position substantially parallel to the film strip, which position facilitates and encourages the desired subsequent locking engagement of the pull-strip 92 and the film strip 40. Referring to FIG. 5, however, it will be seen that while the engaging surface 126 is at a sufficient height to serve the support and bending function, it is sufficiently below the level of the film strip engaging surface 124 of the hub such that the bent-over latching tongue 110 is not gripped between the film strip 40 and the hub 112, and accordingly, is free to move relative to both of these surfaces. As a result, the prior art force caused by the binding engagement between the hub surface, the bent-over latching tongue 110 and the film surface is eliminated and the force available at the interface of the tapered down section 111 of the latching tongue and the narrow portion 66 of the aperture is accordingly increased.

In addition to eliminating the binding engagement between the latching tongue 110 and the hub surface, the recessed latching tongue engaging surface 126 also serves another important function which further facilitates the passing of the latching tongue into the desired positive engagement with the aperture. FIG. 7 shows a cross-section through the hub 112 illustrating what occurs at the precise moment at which the narrowed section 111 of the latching tongue passes through the necked down portion 66 of the aperture 62 into the locking portion 68 of the aperture. As is evident from this figure, the resisting force of the initial separation of the tear-tab closure 88 causes the bent section of the narrow portion 111 of the tapered latching tongue to forceably engage the inwardly extending tabs 70 causing them to deflect downwardly into the recess above the latching tongue receiving surface 126 and accordingly facilitating passage of the normally wider portion 111 of the latching tongue through the passageway 66 defined by the opposing pair of tabs 70. Following passage through this opening the tabs 70 return to their original planar position and the latching tongue is then positively contained within the locking portion 68 of the aperture and continued advancement of the film strip causes the positively engaged pull-strip to then overcome the resisting force of the tear-tab closure 88 thereby removing the closure from the planar face 86 of the fluid reservoir and processing of the film then continues as is described in the prior art patents referenced herein above.

It should be evident that the exact configuration of the recess 125 and the depth of the latching tongue receiving surface 126 below the film strip receiving surface 124 is dependent upon the particular parameters of the system with which it is meant to cooperate. For example, the depth will vary according to the film thickness, the pull-strip thickness, and the size of the aperture and latching tongue. It has been found, however, that it is particularly advantageous to have the depth of the latching tongue engaging surface 126 below the annular film receiving surface 124 of the hub, a depth at least as great as the lowermost extent of deflection of the opposing tabs 70 when the latching tongue is passing therebetween. Furthermore, in practice it has been found that for a film strip having a thickness of approximately 0.004 inches, the depth of the latching tongue receiving surface 126, is advantageously 6 to 8 times the film thickness below the film receiving surface 124 of the hub.

This invention may be practical or embodied in still other ways without departing from the spirit or essential character thereof. The preferred embodiment described herein is therefore not restrictive, the scope of the invention being indicated by the appended claims and all variations which lie within the scope thereof.

What is claimed is:

1. In a film cassette comprising a housing, a rotatably mounted reel within the housing presenting an annular surface, an elongated strip of photographic film disposed along a predetermined path within said cassette and having one end thereof connected to said reel so that, responsive to the rotation of said reel, said film strip will be progressively coiled around and supported on said reel's annular surface, said film strip having a bottle shaped aperture passing therethrough adjacent its said one end and extending away from said one end to present in sequence a major portion, a necked-down portion and a locking portion, said cassette additionally comprising a processing station containing a quantity of processing fluid sufficient to coat substantially the entire length of said film strip and actuatable responsive to withdrawal of an elongated strip-like structure having a free end bearing against said film strip intermediate its said bottle-shaped aperture and said reel prior to said film strip being coiled around said reel, said free end of said strip-like structure being formed as a latching tongue presenting a neck-down portion, having a width greater than the width of said necked-down portion of said film strip's aperture, located behind a terminating tongue portion having a width greater than both the width of said necked-down portion and said latching portion of said film strip's aperture but less than the width of said major portion of said film strip's aperture, said latching tongue of said strip-like structure thus being adapted to enter said major portion of said bottle-shaped aperture of said film strip and become disposed between said annular surface of said reel and an adjacent section of said film strip in a folded back manner with respect to other portions of said strip-like structure as said reel is rotated to progressively coil said film strip therearound, the improvement comprising:

a recess formed in said annular surface of said reel and configured to present another surface positioned radially inwardly of said annular surface of said reel, said recess being structured with a width and depth dimensioned to receive therewithin said latching tongue of said strip-like structure as said film strip is coiled onto said reel and to support said latching tongue on its said other surface to cause it to fold back with respect to other portions of said strip-like structure without squeezing said latching tongue between said other surface of said reel and said adjacent coiled section of said film strip whereby substantial frictional forces are not developed between said latching tongue and said adjacent sections of said reel and said coiled film strip, which forces otherwise would tend to preclude slidable motion between said folded back latching tongue and said adjacent section of said reel and said coiled film strip facilitating said necked-down portion of said strip-like structure's latching tongue snapping through said necked-down portion of said film strip's aperture and entering said locking portion of said film strip's aperture.

2. The apparatus recited in claim 1 wherein said recess is substantially centrally axially disposed in said annular surface of said reel and is laterally defined by axially spaced opposed sections of said annular surface upon which said film strip bears when said strip is coiled thereupon.

3. The apparatus of claim 2 wherein said necked-down portion of said aperture is defined by a pair of opposed inwardly extending tabs so that following entrance of said latching tongue into said major portion of said bottle-shaped aperture of said film strip, said neck-down portion of said latching tongue, in response to the resisting force of withdrawal of said strip-like structure, is caused to forcibly engage said pair of opposing tabs and to deflect said tabs into said recess, thereby increasing the spacing between said opposed tabs and facilitating passage of said necked-down portion of said latching tongue into said locking portion of said aperture.

4. The apparatus of claim 3 wherein the depth of said other surface below said annular surface is at least as great as the lowermost extent of deflection of said tabs.

5. The apparatus of claim 1 wherein the depth of said other surface below said annular surface is between about 6 to 8 times the film strip thickness.

6. The apparatus of claim 1 wherein said other surface is defined by the upper end of at least one free standing, upwardly and circumferentially extending wall section integrally formed with and extending from a lower surface of said reel.

7. The apparatus of claim 6 wherein said other surface is defined by the upper ends of a pair of said wall sections disposed in parallel spaced-apart relation.

8. In a film cassette comprising a housing and a rotatably mounted reel within the housing presenting an annular surface, an elongated strip of photographic film disposed along a predetermined path within said cassette and having one end thereof connected to said reel so that, responsive to the rotation of said reel, said film strip will be progressively coiled around and supported on said reel's annular surface, said film strip having a necked-down aperture passing therethrough adjacent its said one end, said cassette additionally comprising a processing fluid reservoir initially sealed by a tear-tab closure, said reservoir containing a supply of processing fluid sufficient to coat substantially the entire length of said film strip and actuable responsive to withdrawal of an elongated strip-like structure having a free end bearing against said film strip intermediate its said necked-down aperture and said reel prior to said film strip being coiled around said reel, said free end of said strip-like structure being formed as a latching tongue configured to pass at least partially through said aperture following initiation of advancement of said film strip to be folded substantially parallel to and in a direction counter to the direction of travel of said film strip upon engaging said annular surface and, subsequently, responsive to the resisting force of said tear-tab closure to enter into locking engagement with said aperture, the improvement comprising:

a recess formed in said annular surface configured to present an engaging surface for receiving and supporting said folded latching tongue upon advancement of said film said engaging surface being at a depth below said annular surface, sufficient to preclude binding engagement of said tongue between said engaging surface and said film strip while also supporting said tongue in its folded position, thereby facilitating achievement of locking engagement between said latching tongue and said aperture.

9. The apparatus of claim 8 wherein said necked-down aperture comprises a latching tongue receiving portion nearest said one end of said film strip and a locking portion spaced from said tongue receiving portion by a necked-down portion, said necked-down portion being defined by a pair of opposed inwardly extending tabs, said latching tongue comprises a tapered arrow-head shaped section at its free end and a necked-down portion, wider than said necked-down portion of said aperture, connecting said tongue to said strip-like structure, and wherein said recess has a greater axial width than said necked-down portion of said aperture, and the end of said arrow-head shaped section nearest said necked-down portion of said aperture is wider than said locking portion of said aperture; whereby upon advancement of said film strip said latching tongue will first enter said tongue receiving portion of said aperture and, following engagement with said engaging surface and continued advancement of said film strip is caused, in response to the resisting force of said tear-tab closure to forcibly engage said pair of opposed tabs and to deflect said tabs into said recess means, increasing the spacing between said tabs and facilitating passage of said necked-down portion of said latching tongue therebetween and into locking engagement with said locking portion.

10. The apparatus of claim 8 wherein the depth of said engaging surface is between about 6 to 8 times the film strip thickness.

11. The apparatus of claim 9 wherein the depth of said engaging surface below said annular surface is at least as great as the lowermost extent of deflection of said tabs.

12. The apparatus of claim 8 wherein the depth of said engaging surface below said annular surface is less than the length of said latching tongue and great enough to preclude binding engagement between said tongue and said engaging surface.

* * * * *